(No Model.)

J. W. RICKER.
CHURN DASHER.

No. 514,164.

Patented Feb. 6, 1894.

Attest:
M. E. Winston.
A. F. Hadle.

Inventor:
J. W. Ricker.
By E. B. Whitmore, Atty.

UNITED STATES PATENT OFFICE.

JOHN W. RICKER, OF CHELSEA, MASSACHUSETTS, ASSIGNOR OF ONE-HALF TO GEORGE A. HORN, OF NEWARK, NEW YORK.

CHURN-DASHER.

SPECIFICATION forming part of Letters Patent No. 514,164, dated February 6, 1894.

Application filed June 16, 1893. Serial No. 477,846. (No model.)

*To all whom it may concern:*

Be it known that I, JOHN W. RICKER, of Chelsea, in the county of Suffolk and State of Massachusetts, have invented a new and useful Improvement in Churn-Dashers, which improvement is fully set forth in the following specification and shown in the accompanying drawings.

One object of my invention is to produce a churn dasher that shall be rotatory but have all the parts within the cream relatively rigid. I also provide the dasher with radial wings for gathering the butter, and with a swivel handle.

The invention is hereinafter fully described and more particularly pointed out in the claims.

Figure 1:
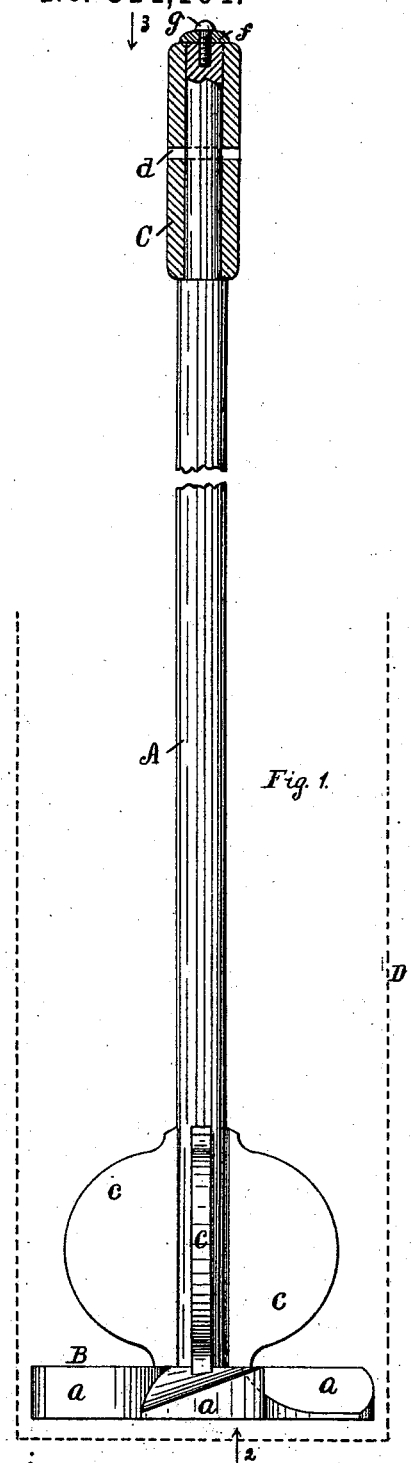
Figure 4:
Figure 3:
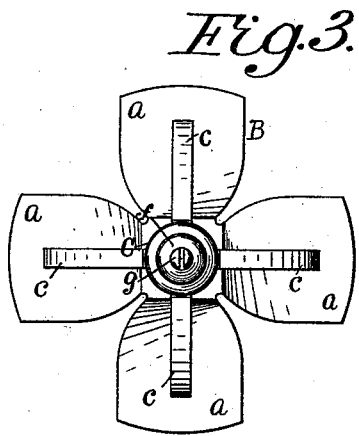
Figure 2:
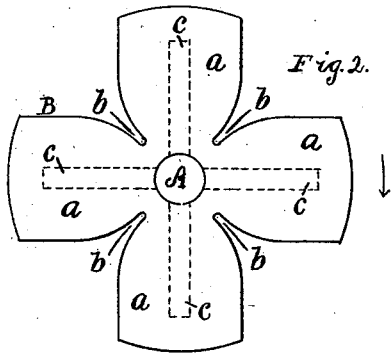

Referring to the drawings, Figure 1 is a side elevation of my improved churn dasher parts at the upper end being longitudinally sectioned. Fig. 2 is an end view of the dasher seen as indicated by arrow 2 in Fig. 1. Fig. 3 is a view at the upper end seen as indicated by arrow 3 in Fig. 1. Fig. 4 shows the holding pin for the movable parts.

Referring to the parts shown A, is the rod or shaft of the dasher and B, the head. C is the handle or part seized by the hands in using the dasher. The heavy dotted lines D, Fig. 1, represent the churn body.

The head of the dasher is preferably constructed with four radial floats $a$ $a$ $a$ $a$, at right angles with each other, made flat or horizontal on their under faces, but inclined on their upper faces, as shown. The floats are purposely made broad, and approximately sectoral or fan-shaped, as shown in Fig. 2, they being separated at their inner ends by narrow radial kerfs $b$, up through which thin streams of cream project when the dasher is forced downward. Above each float is placed a radial, vertical wing $c$, as shown, these being rigid with the shaft A and the respective floats $a$. The outer edges of the wings are preferably curved, as shown, though this exact form is not essential to the successful working of the device.

The handle C is preferably cylindrical as to general form, but it may be longitudinally ribbed or fluted, or otherwise made uneven, if need be, to enable a better hold to be taken of it by the hands. This handle is adapted to turn freely as with a swivel movement upon the reduced upper end of the shaft; and it is formed with a transverse opening $d$, (which likewise passes through the shaft A,) to receive a pin or key $e$, Fig. 4, for locking or holding the parts rigidly together. A circular cap $f$, and an axial screw $g$, passing through the cap and threaded into the shaft, serve to hold the handle in place upon the shaft. Now when the dasher is forced downward into the cream there is no tendency to rotate because the lower faces of the floats correspond to a horizontal plane. But when the dasher is raised through the cream it tends to rotate on account of the inclination of the upper faces of the floats. When the dasher is used for the purpose only of churning the cream, the pin $e$ is inserted through the handle and the shaft to hold those parts rigidly together, the grasp of the hands upon the handle preventing a rotation of the dasher. When the cream is churned and it is wished to gather the butter the pin is removed so that at every upward stroke the dasher is caused to rotate and collect the butter in front of and between the wings $c$.

What I claim as my invention is—

1. In a churn dasher, the combination, with a staff, the lower end of which is provided with floats, and the upper end is transversely perforated and provided with a shoulder, of a transversely perforated tubular sleeve upon the staff, and a removable pin through the perforations, of the sleeve and the staff, substantially as set forth.

2. In a churn dasher, the combination, with a staff, the lower end of which is provided with floats and vertical wings rigidly secured thereto, of a rotatable sleeve upon the upper end of the staff, and means for locking the sleeve against rotation, substantially as set forth.

In witness whereof I have hereunto set my hand, this 10th day of June, 1893, in the presence of two subscribing witnesses.

JOHN W. RICKER.

Witnesses:
JOHN DAVIS,
JAMES S. ST. CLAIR.